United States Patent Office 2,944,073
Patented July 5, 1960

2,944,073

FUNGICIDAL CUPROUS AGENT AND PROCESS OF MAKING SAME

Anatole Vesterman and André Allais, Paris, France, assignors to UCLAF, Paris, France, a body corporate of France No Drawing. Filed Nov. 8, 1957, Ser. No. 695,239

Claims priority, application France Nov. 8, 1956

2 Claims. (Cl. 260—438)

The present invention relates to a fungicidal cuprous derivative of ethylene bis-dithiocarbamic acid, containing approximately 48% of copper and to a process of making same. Said derivative is unusually effective as a fungicide and can be used in agriculture in the treatment of mildew and other fungicidal infections of plants. The new compound is believed to be a chelate and is essentially defined by its mode of preparation as described herein-after and by its copper content.

It is one object of the present invention to provide a cuprous derivative of ethylene bis-dithiocarbamic acid, containing from 47 to 48% of copper, which is unusually effective as a fungicide.

Another object of the present invention consists in providing a simple and economical process of producing such an unusually effective preparation.

Other objects of the present invention and advantageous features thereof will become apparent as the description proceeds.

In order to prepare the product according to the present invention an excess of about 40% over the theoretical amount of cuprous chloride in an aqueous solution is reacted with an aqueous solution of sodium ethylene bis-dithiocarbamate while maintaining the pH between 3 and 4 during the operation by adding hydrochloric acid and working in the presence of sodium chloride in order to solubilize the cuprous chloride. The aqueous solution of sodium ethylene bis-dithiocarbamate can be prepared by the action of carbon disulfide on ethylene-diamine followed by neutralization with sodium hydroxide. The product can also be prepared by metathesis of cuprous chloride and an ethylene bis-dithiocarbamate of an alkali metal or an ethylene bis-dithiocarbamate of an alkaline earth metal. The reaction is preferably effected at room temperature in an inert gas atmosphere in order to avoid the transformation of the cuprous salt into the cupric salt. After metathesis has been effected the precipitate of the chelate formed is washed until the washings are free of chloride. The dried product generally contains 48.2 to 48.8% of copper.

The following example illustrates the present invention without, however, limiting its scope. It is also possible to effect metathesis between the cuprous chloride and an ethylene bis-dithiocarbamate of another metal than those mentioned and to carry out the reaction at a temperature slightly above or below the temperature mentioned without departing from the scope of the present invention.

EXAMPLE

*Preparation of the cuprous derivative of ethylene bis-dithiocarbamic acid*

A. 96 g. of carbon disulphide are introduced into 360 ml. of an aqueous 10% ethylene-diamine solution, heated to 40° C. under stirring for about half an hour and stirring is continued at 40° C. for another hour; then, without cooling 154.5 ml. of a 31% sodium hydroxide solution are slowly added while stirring. Stirring is continued for two other hours after the addition is completed. The orange-yellow solution thus obtained is filtered.

B. 60 g. of cuprous chloride are dissolved in 500 ml. of a saturated sodium chloride aqueous solution and concentrated hydrochloric acid is added in order to adjust the pH value to between 3 and 4.

205 ml. of solution B are added, while stirring and in a nitrogen atmosphere, to 200 ml. of a saturated sodium chloride solution. To this solution 83 ml. of the above described sodium ethylene bis-dithiocarbamate solution A previously mixed with 56 ml. of water and 66 ml. of a saturated sodium chloride solution, are added quite quickly, the pH of the mixture being maintained between 3 and 4. The filtered precipitate, which is the new cuprous derivative, is washed first with 100 ml. of a saturated sodium chloride solution, then with 100 ml. of a 10% ammonia solution and, finally, with water until the washings are free of chloride ions, and dried under a vacuum. Yield: 30.4 g. The product is a dark brown powder containing 47% to 49% of copper; it is insoluble in water, dilute acids and alkalies and in most of the usual solvents. It contains less than 0.25% of water-soluble material.

We claim:

1. As a new product, the cuprous chelate compound with ethylene bis-dithiocarbamic acid, containing from 47% to 49% of copper.

2. In a process of preparing the cuprous chelate compound with ethylene bis-dithiocarmabamic acid, containing from 47% to 49% of copper, the steps comprising reacting in an inert atmosphere and at room temperature, an aqueous solution of a metal salt of ethylene bis-dithiocarbamic acid selected from the group consisting of alkali metal salts and alkaline-earth metal salts, with a solution of cuprous chloride in the presence of a chloride of an alkali metal while maintaining the pH of the solution between 3 and 4, filtering the precipitate and washing it.

References Cited in the file of this patent

UNITED STATES PATENTS

| | | |
|---|---|---|
| Re. 23,742 | Hester | Nov. 24, 1953 |
| 2,208,253 | Flenner et al. | July 16, 1940 |